Jan. 3, 1967  K. E. SUNDSTRÖM  3,296,529
NON-LINEAR SERVO INDICATING SYSTEM WITH PRIMARY LOOP GAIN
VARIABLE AS A FUNCTION OF THE VOLTAGE GRADIENT
PROXIMATE THE NULL BALANCE SLIDER POSITION
Filed Dec. 18, 1963  2 Sheets-Sheet 1
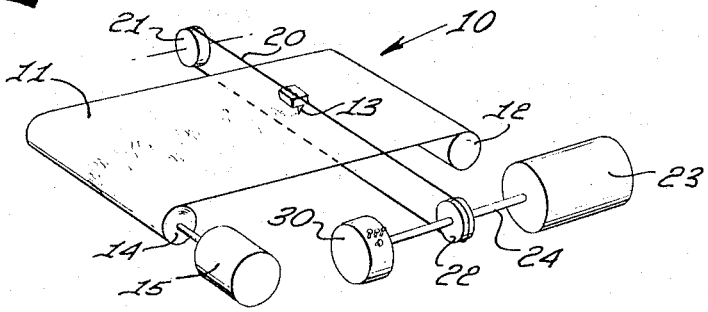
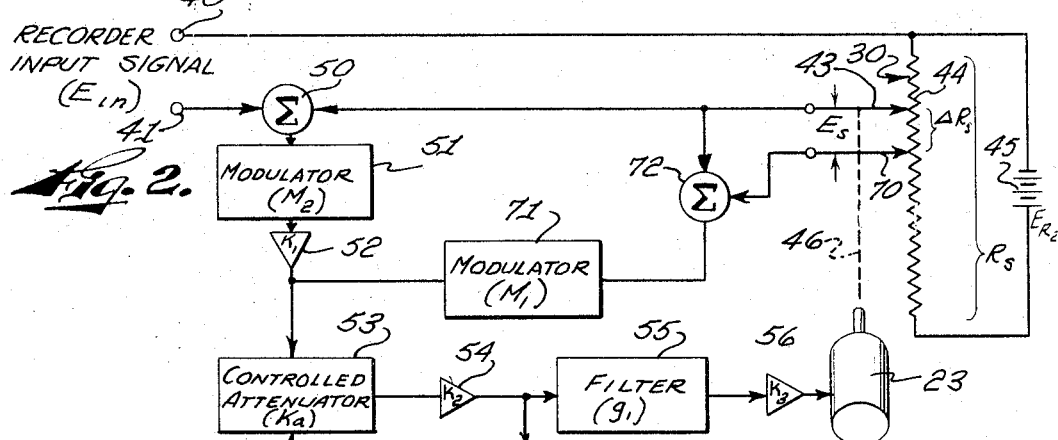
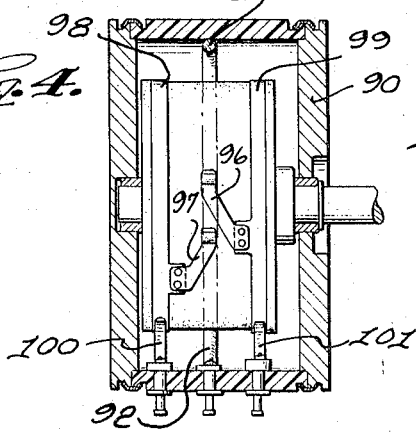
INVENTOR.
KARL ERIC SUNDSTRÖM
BY
FOWLER, KNOBBE
& GAMBRELL
ATTORNEYS

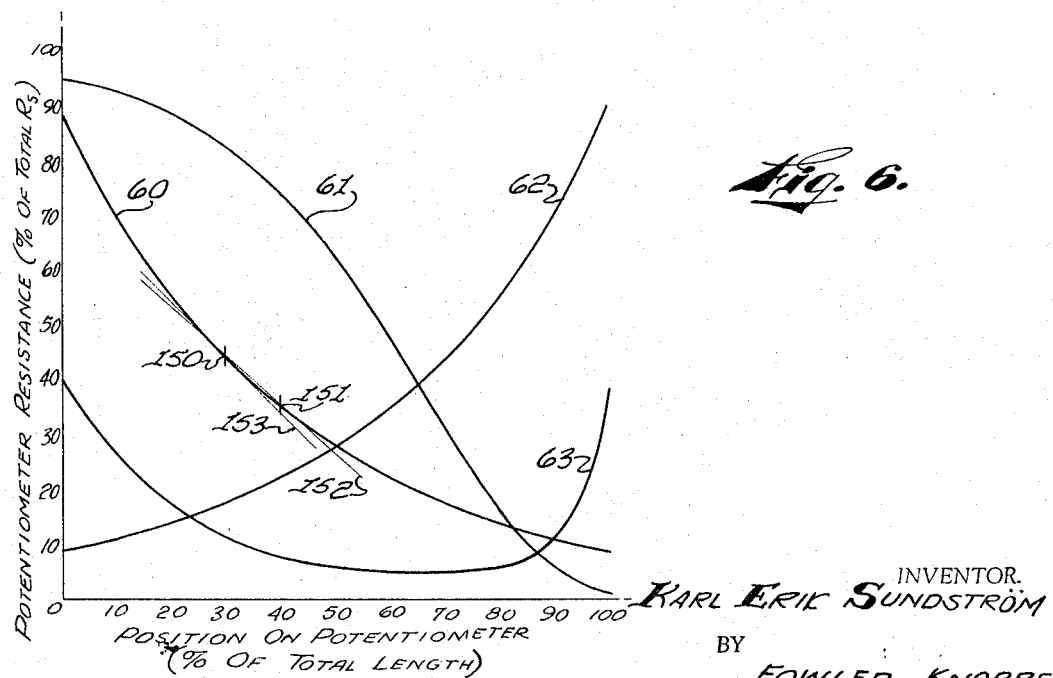

United States Patent Office 3,296,529
Patented Jan. 3, 1967

3,296,529
NON-LINEAR SERVO INDICATING SYSTEM WITH PRIMARY LOOP GAIN VARIABLE AS A FUNCTION OF THE VOLTAGE GRADIENT PROXIMATE THE NULL BALANCE SLIDER POSITION
Karl Erik Sundström, Fullerton, Calif., assignor to Beckman Instruments, Inc., a corporation of California
Filed Dec. 18, 1963, Ser. No. 331,461
13 Claims. (Cl. 324—99)

This invention relates to potentiometric recorder systems and, in particular, improvements therein for recording non-linear functions such as absorbance and log absorbance.

Strip-chart recorders, wherein a flat chart is driven with respect to a pen or other means adapted for inscribing a trace upon the chart, find extensive utilization in instrumentation fields. Very accurate recorders presently known in the art utilize a null balance system wherein the recorder input signal is opposed by a known signal which varies in accordance with the position of the tracing means. The difference between these signals is applied to a servo loop which drives the tracing means to maintain a null balance condition. Generally, the known signal which varies in accordance with the position of the inscribing means is derived from the output of resistance slide wire or potentiometer coupled to a source of reference potential and whose slider contact is driven in conjunction with the pen drive, hence the designation potentiometric recorder system.

The potentiometric recorder system with a predetermined constant servo loop gain operates quite successfully for recording linear functions. However, certain instrumentation systems produce signals representative of non-linear functions and it is advantageous to record such signals by a non-linear recorder wherein the slide wire is wound as a non-linear element. By way of specific example, spectrophotometers generally measure the radiant energy or flux passing through the substance under test relative to that of some standard. The output is recorded as a percent of the transmittance of the sample (%T) or as the absorbance of the sample (A) which is related to the transmittance by the equation $$A = \log_{10} \frac{1}{T} \quad (1)$$

Accordingly, a linear recording of the spectrophotometer output provides transmittance whereas a logarithmic recorder provides a direct recording of absorbance.

A problem associated with non-linear recording systems is that the slope of the null signal varies according to the position of the potentiometer slider contact so that if the transfer functions of the other elements in the servo loop remain constant, the overall servo loop gains will vary according to which portion of the slide wire is being contacted by the movable slider contact. Thus, a given number of turns of the servo motor driving the potentiometer contact will produce different error signal inputs into the servo loop according to the position of the slider contact. The change in slope from one portion of the potentiometer may for certain functions exceed 2000%. These large magnitude changes in overall loop gain adversely affect the performance of the servo system since excessively high signals produced by a steep slope or gradient change of the slide wire saturate the loop amplifiers and produce system instabilities which may result in overshoot and sustained oscillations of the pen drive. Low signal amplitudes produced by gradual slope changes tend to produce "sticky" operation of the servo loop with resultant inaccuracy in movements of the pen drive.

It is the primary object of this invention to provide a non-linear recorder system wherein accurate, stable operation of the servo system is automatically maintained regardless of the non-linear nature of the slide wire resistance element. In a preferred embodiment of the invention, the potentiometer includes an additional slider contact closely spaced to the null balance contact. The voltage between this contact pair closely approximates the voltage gradient or slope at the null contact position. Both the null contact signal and the voltage gradient signal are applied both to a primary servo loop including a gain control element, an amplifier and the servo pen drive motor and to a secondary servo loop including a gain control element and means for comparing the gradient voltage amplitude with a predetermined reference voltage amplitude and varying the gain of the gain control element and hence the secondary loop gain in accordance with the difference voltage therebetween. By changing the gain in the secondary loop, the gain in the primary loop is also changed since the null signal in the primary loop is passing through the gain control element. In this manner, the primary loop gain is changed in such a fashion that the product of this gain and the gradient voltage is maintained at a predetermined constant value.

A more thorough understanding of this invention may be obtained by a study of the following detailed description taken in connection with the accompanying drawings in which:

FIG. 1 is a perspective illustration of the primary components of a strip-chart recorder;

FIG. 2 is a block diagram schematic of a non-linear recorder system constructed in accordance with this invention;

FIG. 3 is a cross-sectional view of a potentiometer incorporating a pair of spaced contacts for use in the recorder system of FIG. 2;

FIG. 4 is a cross-sectional view taken along line 4—4 of FIG. 3;

FIG. 5 is a more detailed circuit schematic of a non-linear recorder system constructed in accordance with this invention; and FIG. 6 illustrates the characteristics of a recorder potentiometer wound as a log and as a log log function and the necessary loop gain compensation functions required by these non-linear functions.

In the following specification, like numerals are used in the drawings to designate like elements.

Referring now to FIG. 1, the strip-chart recorder 10 comprises a strip chart 11 wound upon reel 12 and moved relative to a tracing means 13 by take-up reel 14 driven by motor 15. The tracing means 13 generally comprises an inscribing element such as a pen for making an inked trace on the chart 11. Other tracing means known in the art may also be used, such as an optical system in conjunction with a light-sensitive chart material. The tracing device is driven orthogonally to the direction of movement of chart 11 by a cable 20 engaged by a pulley 21 and a pulley 22, the latter of which is driven by a servo motor 23. Cable 20 may comprise, for example, a stainless-steel cable or, advantageously, a nylon gear-driven tape as taught and claimed in U.S. Patent 3,084,014 of E. W. Molloy, entitled "Pen Drive for Recorders and the Like," assigned to Beckman Instruments, Inc., assignee of the present invention.

A potentiometer 30 is also driven by servo motor shaft 24 for providing a known voltage which varies according to the position of the tracing means 13. As in conventional practice, the servo motor 23 incorporates a gear reduction assembly (not shown) so that a plurality of turns of the servo motor are required to rotate the shaft 24 through a single revolution.

A circuit schematic for a recorder system for non-linear functions constructed in accordance with the present invention is illustrated in FIG. 2. A null balance system for driving the recorder tracing device 13 comprises input terminals 40, 41 adapted for receiving the recorder input signal. This signal is opposed by a known voltage obtained from the output of potentiometer 30 having a movable contact or slider 43 in engagement with a resistance element 44 of resistance $R_s$. This element is connected across a source of known reference potential ($E_{R2}$). Contact 43 is coupled to the servo motor 23 by a coupling 46, e.g. the shaft 24 of FIG. 1. Reference 45 comprises, for example, a mercury cell, so as to provide a very stable source of reference voltage. The polarities of the recorder input signal and the output of the potentiometer are such that when summed in summation network 50, a difference voltage is provided at the output of this network. Any voltage unbalance is applied to the primary servo loop comprising amplifier 52, controlled attenuator 53, amplifier 54, filter 55, amplifier 56, servo motor 23 and potentiometer 30.

In operation, the null balancing potentiometric system continuously compares the recorder input signal against the output of the potentiometer at the servo-driven slider 43, and balances out any differences between the two voltages by the servo-driven slider 43 which moves along the resistance element 44 until the voltages are balanced. The tracing means 13 is coupled to the slider 43 and records its displacement in cancelling out differences between the recorder input signal and reference voltages.

The null balancing system comprising the elements just described is quite satisfactory for linear recording. The resistance characteristic of the potentiometer resistance element is then linear so that its voltage gradient and hence voltage change applied to the null balancing network is the same at any slider position on the potentiometer. Accordingly, a fixed, predetermined gain may be employed in the system. However, as described hereinabove, there are numerous contemporary uses for strip-chart recorders which require recording non-linear functions. Two representative functions are illustrated in FIG. 6 wherein the slider position is plotted in percent of its complete span along the abscissa axis of the diagram and resistance is plotted in percent of the total resistance along the ordinate axis. The characteristic curve of this potentiometer resistance element to provide a logarithmic function is illustrated by curve 60 and, for a log log function, curve 61. Such non-linear curves require substantial gain compensation within the servo loop in order to prevent system instabilities induced by excessive gain and stickiness caused by insufficient gain. The gain compensation curve required for the logarithmic function is illustrated by curve 62 and for the log log function by compensation curve 63.

Variable loop gains are provided in the system of FIG. 2 by a secondary gain control servo loop. As shown, potentiometer 30 includes an addiitonal slider contact 70 adapted to slide along the resistance element 44 in close proximity to the usual contact 43. The contact pair comprising null balance contact 43 and supplementary contact 70 measure the voltage drop or gradient across a small segment of $\Delta R_s$ of the resistance element 44. The voltage gradient signal $E_s$ is defined by the equation $$E_s = \frac{E_{R2}}{R_s} \cdot \Delta R_s \qquad (2)$$

This voltage is introduced to the input of a modulator 71 via a summing network 72. The output of the modulator may be connected to the output of modulator 51 and amplifier 52 as shown, since the signal strength of the voltage drop across $\Delta R_s$ will be sufficiently high to not require preamplification. However, if amplification is desired, the output of modulator 71 may be connected to the output of modulator 51 at the input of amplifier 52. The combined signals are then transferred through the primary servo loop comprising the controlled attenuator 53, and amplifier 54. A secondary gain control servo loop includes the controlled attenuator 53 and amplifier 54 and further comprises filter 80, demodulator 81, filter 82, summation network 83 and reference source 84. Filter 80 filters out the modulated null balance signal and passes the modulated signal corresponding to the voltage gradient across $\Delta R_s$. The output of this filter is demodulated in demodulator 81 and compared with the reference voltage $E_{R1}$ to provide a control signal $E_c$. This control signal determines the attenuation factor of the controlled attenuator 53.

Filter 55 removes the modulated signal derived from modulator 71 and passes the signal corresponding to the null signal derived by comparing the recorder input signal with the known voltage at the output of slider 43.

The operation of the secondary servo loop for providing a compensated gain function within the primary loop is as follows: The secondary servo loop includes the controlled attenuator 53, whose gain is determined by the control signal $E_c$ provided by this secondary loop. This signal is determined by the equation:

$$E_c = E_s \cdot M_e (\cos 2f_2 t) \\ K_a \cdot K_2 \cdot G_2 \cdot D_e \cdot G_3 - E_{R1}$$

where $E_s$ = voltage gradient signal
$M_e$ = modulation efficiency factor of modulator 71
$f_2$ = modulating frequency of modulator 71
$K_a$ = attenuation factor of attenuator 53
$K_2$ = amplification factor of amplifier 54
$G_2$ = transfer function of filter 80
$D_e$ = demodulator efficiency of demodulator 81
$G_3$ = transfer function of filter 82
$E_{R1}$ = reference voltage All of these parameters are constant except $E_s$; accordingly, the gain of this secondary loop is determined by the voltage gradient between the slider contacts 43, 70. The controlled attenuator 53 is also in the primary loop path; hence, by changing the gain in the secondary loop, the gain in primary loop is also changed since the null signal in the primary loop is passing through the controlled attenuator 53. In this manner, the primary loop gain is changed, according to the voltage gradient proximate the null balance slider position, to maintain the product of the primary servo loop gain and the measured voltage gradient $E_s$ at a constant value determined by the reference voltage $E_{R1}$. Stated in another way, the voltage gradient of the slidewire is continuously sampled and this information used to continuously vary the primary servo loop gain.

FIGS. 3 and 4 are detailed illustrations of a potentiometer adapted for use in the system of FIG. 2. This potentiometer comprises a housing 90 rotatably mounting a shaft 91 and fixedly supporting a single turn resistance element 92. Shaft 91 carries a rotor member 95 on which are mounted respective slider contacts 96, 97 located in a common plane perpendicular to shaft 91 and respectively connected to axially displaced slip rings 99, 98 engaged by respective brushes 100, 101. The slider contacts 96, 97 correspond to the contacts 43, 70 of FIG. 2. The arcuate spatial separation (angle α) between these contacts is determined by the preselected value of ΔR_s. As described in more detail hereinafter, this value will normally be greater than 1% of the total resistance element R_s but will not usually exceed 10% thereof.

FIG. 5 illustrates a detailed structure for specific portions of the schematic of FIG. 2. As shown, each of the modulators 51, 71 comprise a full wave sampling switch driven at the modulating frequency and coupled to a center tapped winding of transformer 111. Thus, modulator 51 comprises single pole-double throw switch 104 having a movable contact 105 alternately driven between stationary contacts 106, 107 by driver coil 108 coupled to the modulating source 109 of frequency $f_1$. Movable contact 105 is connected to slider contact 43. Stationary contacts 106, 107 are connected to end terminals of transformer primary winding 110. The recorder input terminals 40, 41 are connected respectively to the common terminal of potentiometer winding 44 and the midpoint of primary winding 110.

The movable switch contact 113 of modulator 71 is driven by the modulating source 114 of frequency $f_2$. This contact is connected to the null balance contact 43. The output of this switch is connected to the end terminals of transformer primary winding 115. The supplementary slider contact 70 is connected to the midpoint of this winding. The signal appearing at the output of transformer secondary winding 112 is then the combination of the modulated signals derived from modulators 51 and 71, which signals comprise the modulated null signal and the modulated voltage gradient signal. These signals are modulated by distinct modulation frequencies to permit their separation in the primary and secondary servo loops. In a representative system, the modulating frequency of modulator 51 ($f_1$) is 60 c.p.s. and the frequency ($f_2$) for the secondary loop is 400 c.p.s. Accordingly, filter 55 in the primary loop is adapted for removing 400 c.p.s. components and filter 80 in the secondary loop is adapted for removing 60 c.p.s. components. Controlled attenuator 53 advantageously comprises resistance element 120 and diodes 121, 122. The control signal $E_c$ provided by the secondary servo loop supplies the D.C. control signal $E_c$ for varying the conduction of the diode pair 121, 122. This attenuator forms a voltage divider having one leg comprising resistance 120 and the other leg comprising diodes 121, 122 connected in parallel to ground, diode 122 being directly connected to ground and diode 121 being connected to ground via the reference source 84 of low internal impedance. As a result, the signal at the output of amplifier 52 is divided by the attenuator and only the portion appearing across diodes 121, 122 is applied to the input of amplifier 54.

Filter 82 advantageously comprises a smoothing filter formed by series of resistance 130 and parallel coupled capacitor 131 and resistance 132, wherein capacitor 131 is charged through resistance 130 and discharged through resistance 132. This type of filter has the advantage of allowing the use of the well-known diode demodulator circuit for demodulator 81.

As described hereinabove, FIG. 6 illustrates curves 60 and 61 which are typical functions (log and log log) provided by non-linear recorders. FIG. 6 further illustrates the basis upon which the accuracy of the above-described recorder system is predicated. Thus, assume that the null balance contact and the supplementary contact are spaced apart a distance corresponding to 10% of the total length of the resistance element and are respectively located at points 150, 151 of the log curve 60 of FIG. 6. The voltage gradient at this location of the resistance element is then illustrated by straight line 152 drawn through these points. The actual slope of the curve 60 at point 150 is defined by the straight line 153. The slope differences between lines 152, 153 is the gain compensation error at point 150 when the contacts are separated through a distance ΔR equal to 10% of the entire length of the potentiometer resistance element. It will be evident that this error decreases as the value of ΔR is decreased. However, as ΔR is decreased, so also is the signal level $E_s$ decreased. The particular contact spacing used will be a compromise in which the signal amplitude level is sufficient above the potentiometer and system noise level and the slope errors are maintained within the capabilities of the system. Normally, ΔR_s will be greater than 1% of the total length of the slidewire and no greater than 10% thereof.

By way of specific example, the slope for the log curve 60 is compared with the slope derived from the spaced contacts in the following table:

| L (percent) | ΔR_s=0 | ΔR_s=1% | ΔR_s=5% | ΔR_s=10% | Slope Error in percent at ΔR_s=10% |
|---|---|---|---|---|---|
| 0 | −2.04 | −2.02 | −1.94 | −1.83 | 10.3 |
| 20 | −1.285 | −1.27 | −1.22 | −1.16 | 9.7 |
| 10 | −0.812 | −.804 | −.772 | −.728 | 10.3 |
| 40 | −0.513 | −.508 | −.488 | −.459 | 10.5 |
| 60 | −0.324 | −.321 | −.308 | −.289 | 10.8 |
| 800 | −0.204 | −.202 | −.194 | −.183 | 10.3 |

Thus, for the log curve, the maximum slope error is approximately 11% for a spacing ΔR_s equal to 10%. For more complex curves, the slope errors will increase; however even errors of 30% are well within the capability of most servo systems and are substantially less than the overall loop gain variations with no compensation.

Accordingly, the present invention provides a non-linear potentiometric recording system which automatically adjusts itself to the non-linearities of the potentiometer resistance element. Accordingly, the only change required during manufacture is to install the potentiometer with the desired non-linear function. A significant corollary is that the recorder may be changed in the field to record a different non-linear function merely by installing a potentiometer having the desired resistance characteristic.

The present invention further makes it practical to provide a recorder adapted for recording plural non-linear functions. Thus, in the system of FIG. 1, two or more ganged potentiometers, such as the element of FIGS. 3 and 4, may be driven by shaft 24. Since the system automatically adjusts its controlled attenuator by continuously sampling the voltage gradient, the recorder may be switched from one function to another by switching from one potentiometer to the other.

Although exemplary embodiments of the invention have been disclosed and discussed, it will be understood that other applications of the invention are possible and the embodiments and methods disclosed may be subjected to various changes, modifications and substitutions without necessarily departing from the spirit of the invention.

I claim:

1. A potentiometric recorder system for recording non-linear functions comprising
   a chart;
   means for applying a trace to said chart;
   means for moving said chart relative said tracing means;
   a non-linear resistance element adapted to be connected to a known reference source and having movable null balance and supplementary slider contacts in fixed spaced contact therewith and driven according to said tracing means;
   a primary servo loop including
      means for obtaining the difference between the output signal on said null balance contact and the recorder input signal,
      means for modulating said difference signal,
      a controlled attenuator passing said modulated difference signal,
      filter means for passing said modulated difference signal, and
      means for moving said tracing means responsive to said difference signal;

means for modulating the gradient voltage between said null balance and supplementary slider contacts;

means for connecting the modulated gradient voltage to the input of said controlled attenuator;

a secondary servo loop including said controlled attenuator and filter means for passing said modulated gradient voltage and blocking said modulated difference signal, means for demodulating said modulated gradient voltage, means for comparing the output of said demodulator with a reference voltage source for generating a control signal operatively connected to said controlled attenuator so that the secondary loop gain is varied in accordance with the gradient voltage, said controlled attenuator also controlling the gain of said primary servo loop so that its gain is changed such that the product thereof and the gradient voltage is maintained at a predetermined constant value.

2. The potentiometric recorder system defined in claim 1 wherein each of said modulator means comprises full-wave sampling switches driven at respectively different modulating frequencies.

3. The potentiometric recorder system defined in claim 1 wherein said controlled attenuator comprises a voltage divider having a resistance as one leg thereof and a pair of parallel connected diodes as the other leg thereof, said control voltage determining the conduction of said diodes and thereby the attenuation factor of said controlled attenuator.

4. The potentiometric recorder defined in claim 1 wherein said null balance and supplementary slider contacts are spaced sufficiently far apart so that the gradient voltage is substantially greater than the noise characteristics of the potentiometer and the secondary servo loop but not far enough apart to introduce a slope error greater than that which can be handled by the primary servo loop.

5. The potentiometric recorder system of claim 4 wherein the spacing between said slider contacts is selected from between 1% and 10% of the total length of said non-linear resistance element.

6. The potentiometric recorder system of claim 1 wherein said potentiometer comprises a rotor rotatably mounted within said housing, a resistance element fixably mounted within said housing and having a circular configuration lying within a plane orthogonal to the rotor axis, a pair of contacts affixed to said rotor and contacting said resistance element at positions spaced a predetermined arcuate distance, and slip ring means for independently making electric contact with said respective slider contacts.

7. A potentiometric recorder system comprising a chart, means for applying a trace to said chart, a potentiometer adapted to be connected to a known reference source and having a movable slider contact driven according to said tracing means, servo loop means for detecting the difference between the recorder input signal and the output of said potentiometer, amplifying said difference, and moving the tracing means to null said difference, means for continuously sampling the voltage gradient of said potentiometer resistance proximate the slider contact position, and means responsive to said gradient sampling means for changing the gain of said servo loop means so that the product of the gain and the voltage gradient is maintained at a predetermined constant value.

8. In a potentiometric strip-chart recorder having a chart, a means for inscribing a trace upon said chart, means for moving said chart relative said tracing means, and a null balance means driving said tracing means for accurately reproducing the recorder input signal, said null balance means opposing the recorder input voltage with a known voltage obtained from the output of a potentiometer whose slider varies according to the position of said tracing means, means for detecting the unbalance voltage, means for amplifying said detected unbalance voltage, and means responsive to said amplified signal for driving the tracing means and coupled potentiometer toward null, the improvement wherein said potentiometer comprises a pair of contacts in fixed spaced relationship movably engaging the potentiometer resistance element for providing a pair of output voltages, means for providing the difference between said pair of output voltages, and means for varying the gain of said amplifying means according to the value of said difference voltage so that the product of the gain and said difference voltage is maintained at a predetermined constant value.

9. In a potentiometric strip-chart recorder having a chart, a means for inscribing a trace upon said chart, means for moving said chart relative said inscribing means, and a null balance servo means driving said tracing means for accurately reproducing the recorder input signal, said null balance servo means including means for generating a null voltage by opposing the recorder input voltage with a known voltage obtained from the output of a potentiometer whose slider position varies according to the position of said tracing means, means for amplifying said null voltage, and means responsive to said amplified null voltage for driving the tracing means and coupled potentiometer for producing a null condition, the improvement wherein said potentiometer includes means for providing the voltage gradient proximate the potentiometer slider position, and means for varying the gain of said servo means so that the product of said gain and said gradient is maintained at a predetermined constant value.

10. A potentiometric indicating system for indicating non-linear functions comprising means for indicating an analog signal;

a non-linear resistance element adapted to be connected to a known reference source and having movable null balance and supplementary slider contacts in fixed spaced contact with said non-linear resistance element and driven according to said means for indicating an analog signal;

a primary servo loop including means for obtaining the difference between the output signal on said null balance contact and said analog input signal, means for modulating said difference signal, a controlled attenuator passing said modulated difference signal, filter means for passing said modulated difference signal, and means for actuating said indicating means responsive to said difference signal;

means for modulating the gradient voltage between said null balance and supplementary slider contacts;

means for connecting the modulated gradient voltage to the input of said controlled attenuator;

a secondary servo loop including said controlled attenuator and filter means for passing said modulated gradient voltage and blocking said modulated difference signal, means for demodulating said modulated gradient voltage, means for comparing the output of said demodulator with reference voltage source for generating a control signal operatively connected to said control attenuator so that the secondary loop gain is varied in accordance with the gradient voltage, said controlled attenuator also controlling the gain of said primary servo loop so that its gain is changed such that the product thereof and the gradient voltage is maintained at a predetermined constant value.

11. A potentiometric indicating system for indicating non-linear functions comprising means for indicating an analog signal;

a non-linear resistance element adapted to be connected to a known reference source and having a movable slider contact driven according to said indicating means;

servo loop means for detecting the difference between an input signal to said indicating means and an output signal of said potentiometer, for amplifying said difference, and for actuating said indicating means to null said difference;

means for continuously sampling the voltage gradient of said potentiometer resistance proximate the slider contact position; and means responsive to said gradient sampling means for changing the gain of said servo loop means so that the product of the gain and the voltage gradient is maintained at a predetermined constant value.

12. In a servo system for producing motion of a controlled element as a non-linear function of an input signal, the combination comprising a non-linear resistance element adapted to be connected to a known reference source and having movable null balance and supplementary slider contacts in fixed spaced contact with said non-linear resistance element and driven according to said controlled element;

a primary servo loop including means for obtaining the difference between the output signal on said null balance contact and said input signal, means for modulating said difference signal, a controlled attenuator passing said modulated difference signal, filter means for passing said modulated difference signal, and means for actuating said controlled element responsive to said difference signal;

means for modulating the gradient voltage between said null balance and supplementary slider contacts;

means for connecting the modulated gradient voltage to the input of said controlled attenuator;

a secondary servo loop including said controlled attenuator and filter means for passing said modulated gradient voltage and blocking said modulated difference signal, means for demodulating said modulated gradient voltage, means for comparing the output of said demodulator with a reference voltage source for generating a control signal operatively connected to said controlled attenuator so that the secondary loop gain is varied in accordance with the gradient voltage, said controlled attenuator also controlling the gain of said primary servo loop so that its gain is changed such that the product thereof and the gradient voltage is maintained at a predetermined constant value.

13. In a servo system for producing motion of a controlled element as a non-linear function of an input signal, the combination comprising a non-linear resistance element adapted to be connected to a known reference source and having a movable slider contact driven according to said controlled element;

servo loop means for detecting the difference between an input signal to said controlled element and an output signal of said potentiometer, for amplifying said difference, and for actuating said controlled element to null said difference;

means for continuously sampling the voltage gradient of said potentiometer resistance proximate the slider contact position; and means responsive to said gradient sampling means for changing the gain of said servo loop means so that the product of said gain and the voltage gradient is maintained at a predetermined constant value.

References Cited by the Examiner
UNITED STATES PATENTS

| 2,941,147 | 6/1960 | McKinlay | 324—99 |
| 2,956,253 | 10/1960 | Clayton | 338—137 |

RUDOLPH V. ROLINEC, *Primary Examiner.*

WALTER L. CARLSON, *Examiner.*

J. J. MULROONEY, *Assistant Examiner.*